UNITED STATES PATENT OFFICE.

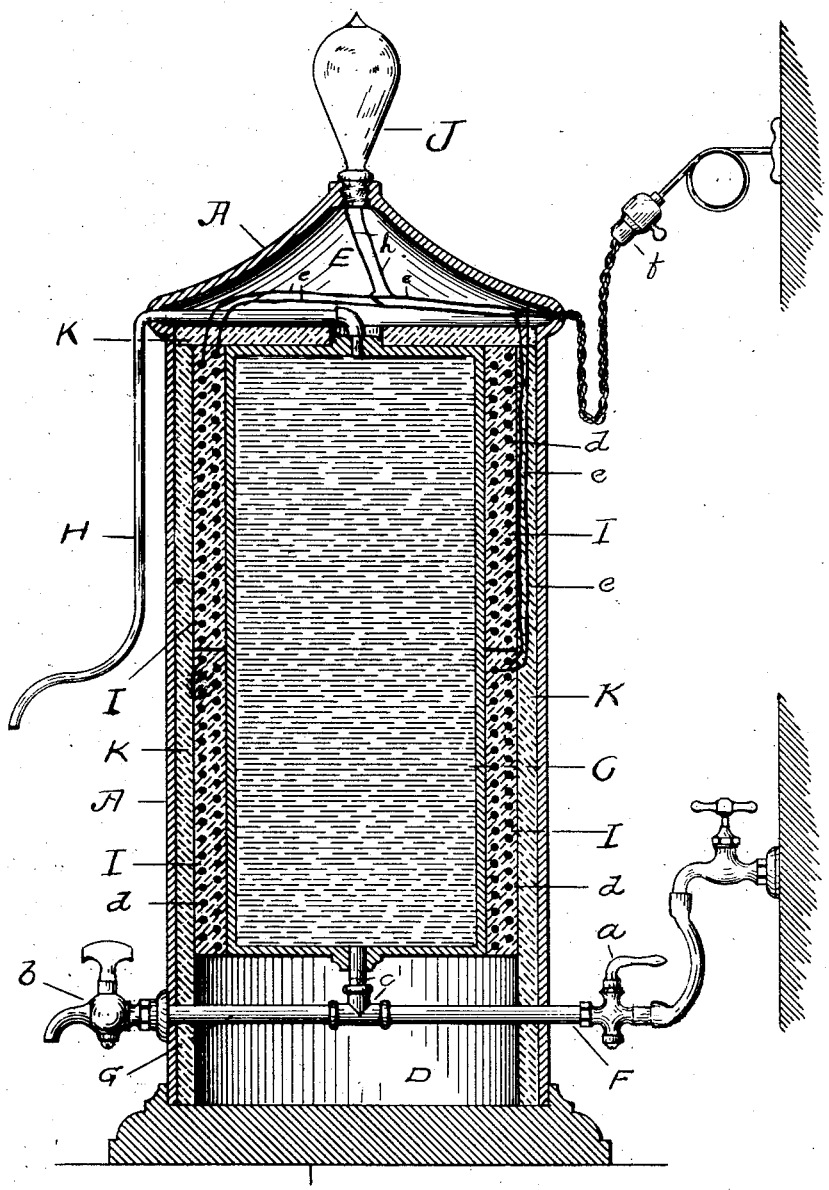

EDWIN R. WATERMAN, OF SAN FRANCISCO, CALIFORNIA.

ELECTRIC HEATER.

No. 844,979.　　　Specification of Letters Patent.　　Patented Feb. 19, 1907.

Application filed February 15, 1904. Serial No. 193,762.

*To all whom it may concern:*

Be it known that I, EDWIN R. WATERMAN, a citizen of the United States, and residing at San Francisco, in the county of San Francisco and State of California, have invented certain new and useful Improvements in Electric Heaters; and I do hereby declare that the following is a full, clear, and exact description of said invention, such as will enable others skilled in the art to which it most nearly appertains to make, use, and practice the same.

My invention relates to that class of devices which are especially constructed for the purpose of heating instantaneously liquids by electric means, and consists particularly in the arrangement or combination of its various parts coöperating to obtain the desired result, as will be hereinafter more particularly described, and pointed out in the claims.

The object of my invention is to simplify the construction of that class of devices and at the same time increase their effectiveness, and, furthermore, which can be used with either a direct or alternating current, as may be desired.

A further object I have in view is to provide means to increase the heating-surface, whereby a larger body of running hot water can be obtained instantaneously and keep it at comparative degree of heat for some time after its sources of supply are cut off.

A still further object of my invention is to provide means wherewith the same can be easily and quickly connected to an incandescent-lamp socket and liquid-supply or water-faucet and disconnected for the purpose of carrying away its contents when desired.

Referring to the herewith-annexed drawing, consisting of one figure, a central vertical sectional view is shown of the invention which forms a part of this specification, in which like letters of reference made use of in the drawing indicate like parts wherever employed.

A represents the outer shell or casing of my invention, which is provided with bottom B, removably secured thereon for the purpose of repairing or adjusting, when desired, the various parts placed therein. The casing is preferably made of thin metallic material and of a convenient and ornamental shape to present a neat appearance. Secured centrally within the casing is a receptacle C, which is placed in such a manner to form the hot-air chamber D below its bottom and similar chamber E above its top, and the lower end of the receptacle is provided with an inlet and an outlet, while the upper end has a vent for safety and other objects which will be mentioned hereafter. Within the receptacle the desired liquid brought therein is heated by electric means adjustably secured around its outer circumference.

The inlet previously mentioned consists of pipe F, which is provided with stop-cock *a*, conveniently secured at suitable place thereon, and may be connected either permanently or temporarily to the source of liquid-supply, as desired, or to a water-faucet by means of rubber hose, as shown in the drawing, and its outlet consists of pipe G, which is provided with faucet *b*. Both the inlet and outlet pipes are secured within the chamber D to the bottom of the receptacle by means of a T and connecting-fittings *c*. Thus in this manner I provide one adjustment only to the receptacle.

The vent previously mentioned consists of pipe H, secured within the chamber E to the top part of the receptacle and projecting outwardly through the casing and downwardly along its side and curved outwardly for convenient purposes. This vent, aside of being for safety purposes, as previously mentioned, serves also as a regulator to indicate that the receptacle is full or as an outlet when a continuous running stream of heated liquid is desired.

By the above-described arrangement, relating particularly to the inlet and outlet and the vent, it will be readily conceived that I am able to draw through the faucet *b* the liquid directly from its source of supply and at the same time retain within the receptacle the liquid which may be contained therein by plugging the vent-orifice and by the same means to draw the heated liquid from the receptacle by turning off the stop-cock *a* of the inlet-pipe F and removing the plug from the vent-orifice, which may have been placed thereon for the purpose just mentioned.

The electric means adjustably secured around the circumference of the receptacle, as previously mentioned, consists, preferably, of a plurality of cores I, the number of which depends, however, on the size of the receptacle or the surface to be heated and are made of layers of suitable material, around which resistance-wires *d* are wound in coils or spiral-like manner. These cores are placed independently one above the other in a vertical line if used in plurality and are adapted to be removed from their position when desired for the purpose of replacing or repairing them. The ends $e$ of the wire $d$ just mentioned project into the hot-air chamber E, formed above the top part of the receptacle, as already stated, and are connected therein to the power-wire, thus generating the heat within the cores, or they may project outwardly through the casing and be provided with plug $f$, adjustable to an electric-lamp socket, as shown in the drawing. In this case my invention can be easily and quickly connected wherever most convenient, and thus carry out the object I have in view.

The central top part of the casing is provided with an incandescent lamp J, which is connected to the power-wire by means of connecting ends $h$. Arranged in this manner, when the current is applied to my invention the light from the lamp will indicate that fact, thus serving as an indicator. The casing is provided with suitable packing K, interposed between its side and the cores, and also the top part of the receptacle is similarly provided, the object of which and the chambers D and E is to provide suitable means around the receptacle for the purpose of retaining the heat therein.

With my invention if desired to keep the liquid at a desired or uniform degree of temperature for various purposes I place a rheostat or similar device in the circuit, thus regulating the current passing therein.

Believing I have made novel and useful improvements in that class of electric heating devices and produce a simple and convenient means whereby liquid can be instantaneously heated to a desired degree of temperature and having described the same, what I claim, and desire to secure by Letters Patent of the United States, is—

1. An electric heater provided with an outer cylindrical shell, a central liquid-containing receptacle formed within said shell and having an inlet and an outlet connected to said receptacle in combination with a sectional electric heating device interposed between the shell and the receptacle.

2. An electric heater provided with an inner liquid-containing receptacle having an inlet and an outlet, in combination with a heat-generating device secured around said receptacle consisting of a plurality of cores arranged in a vertical line one above the other.

3. An electric heater provided with an inner liquid-containing receptacle having an inlet and an outlet, in combination with a heat-generating device secured around said receptacle consisting of a plurality of independent cores.

4. An electric heater consisting of an outer shell having an inner central receptacle provided with an inlet and an outlet in combination with a vent secured to said inner chamber.

5. An electric heater provided with an outer shell having an inner central receptacle formed therein, in combination with means to form a combined inlet and outlet secured to said receptacle.

6. An electric heating apparatus provided with a liquid-containing receptacle in combination with a combined inlet and outlet secured to said receptacle and adapted to form a continuous liquid-passage.

7. An electric heating device provided with an outer casing having a receptacle formed therein, in combination with a hot-air chamber formed below the lower part of the receptacle.

8. An electric heating device provided with an outer casing having a receptacle formed therein in combination with hot-air chambers formed below and above said receptacle.

9. An electric heating device provided with an outer casing having a receptacle formed therein, in combination with a hot-air chamber formed above said receptacle.

10. An electric heating device provided with an outer casing having a receptacle therein, in combination with a hot-air chamber formed within said outer casing.

11. An electric heating device provided with an outer casing having a liquid-containing receptacle therein in combination with hot-air chambers formed within said outer casing.

In testimony whereof I have affixed my signature, in presence of two witnesses, this 6th day of February, A. D. 1904.

EDWIN R. WATERMAN.

In presence of—
  J. CORINSON,
  P. W. BRADY.